US012688454B2

(12) United States Patent
Vichare et al.

(10) Patent No.: US 12,688,454 B2
(45) Date of Patent: Jul. 21, 2026

(54) SYSTEM METHOD AND CODE FOR UN-LEARNING AN INDIVIDUAL FROM AN ARTIFICIAL INTELLIGENCE (AI) MODEL

(71) Applicant: Dell Products, L.P., Round Rock, TX (US)

(72) Inventors: Nikhil Manohar Vichare, Austin, TX (US); Selvadeepan Gunasekaran, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1220 days.

(21) Appl. No.: 17/182,632

(22) Filed: Feb. 23, 2021

(65) Prior Publication Data

US 2022/0269979 A1 Aug. 25, 2022

(51) Int. Cl.
| | |
|---|---|
| *G06N 20/00* | (2019.01) |
| *G06N 5/04* | (2023.01) |
| *G06Q 10/0635* | (2023.01) |
| *G06Q 10/067* | (2023.01) |
| *G06Q 50/18* | (2012.01) |

(52) U.S. Cl.
CPC .............. *G06N 20/00* (2019.01); *G06N 5/04* (2013.01)

(58) Field of Classification Search
CPC ......... G06N 200/00; G06N 5/04; G06N 20/00
See application file for complete search history.

(56) References Cited

U.S. PATENT DOCUMENTS

2017/0006135 A1* 1/2017 Siebel ...................... G06F 8/10

OTHER PUBLICATIONS

Cao, Yinzhi and Junfeng Yang, "Towards Making Systems Forget with Machine Unlearning", 2015, IEEE, pp. 463-464 and 473 (Year: 2015).*
Warnecke, Alexander, Lukas Pirch, Christian Wressnegger and Konrad Rieck, "Machine Unlearning of Features and Labels", arXiv, 2021, pp. 4-5 (Year: 2021).*
Ginart, Antonio A, Melody Y. Guan, Gregory Valiant and James Zou, "Making AI Forget You: Data Deletion in Machine Learning", 2019, Advances in neural information processing systems, p. 5 (Year: 2019).*

(Continued)

*Primary Examiner* — Usmaan Saeed
*Assistant Examiner* — Skylar K Vanwormer
(74) *Attorney, Agent, or Firm* — Fogarty LLP

(57) ABSTRACT

According to one illustrative, non-limiting embodiment, an IHS may include computer-executable instructions for receiving individual-specific raw data instances associated with an individual, and other raw data instances that are not associated with the individual to perform a native artificial intelligence (AI) process to generate one or more native features according to the received other raw data instances and the individual-specific raw data instances, and a native AI model from the one or more native features. The instructions also perform a differential AI process to generate one or more differential features according to the received other raw data instances, and a differential model from the one or more differential features. The native features may be compared against the differential features to determine one or more feature influence levels, while the native model may be compared against the differential model to determine a model influence level of the individual-specific raw data instance on the native model.

20 Claims, 5 Drawing Sheets

(56) References Cited

OTHER PUBLICATIONS

Cao, Yinzhi and Junfeng Yang, "Towards Making Systems Forget with Machine Unlearning", 2015, IEEE, pp. 463-475 (Year: 2015).*
Bourtoule, Lucas, Varun Chandrasekaran, Christopher A. Choquette-Choo, Hengrui Jia, Adelin Travers, David Lie and Nicolas Papernot, "Machine Unlearning", Dec. 15, 2020, pp. 10 and 16 (Year: 2020).*
Ginart, Antonio A, Melody Y. Guan, Gregory Valiant and James Zou, "Making AI Forget You: Data Deletion in Machine Learning", 2019, Advances in neural information processing systems, p. 1-5 (Year: 2019).*
Han, Jin, Meng Pan, Debin Gao and Hweehwa Pang, "A Multi-User Steganographic File System on Untrusted Shared Storage", Dec. 2010, ACM, p. 317-318 (Year: 2010).*
Xing, Zhenchang, "GenericDiff: A General Framework for Model Comparison", 2010, Research Gate, p. 1 (Year: 2010).*
Cao, Yinzhi and Junfeng Yang, "Towards Making Systems Forget with Machine Learning", 2015, IEEE (Year: 2015).*

* cited by examiner

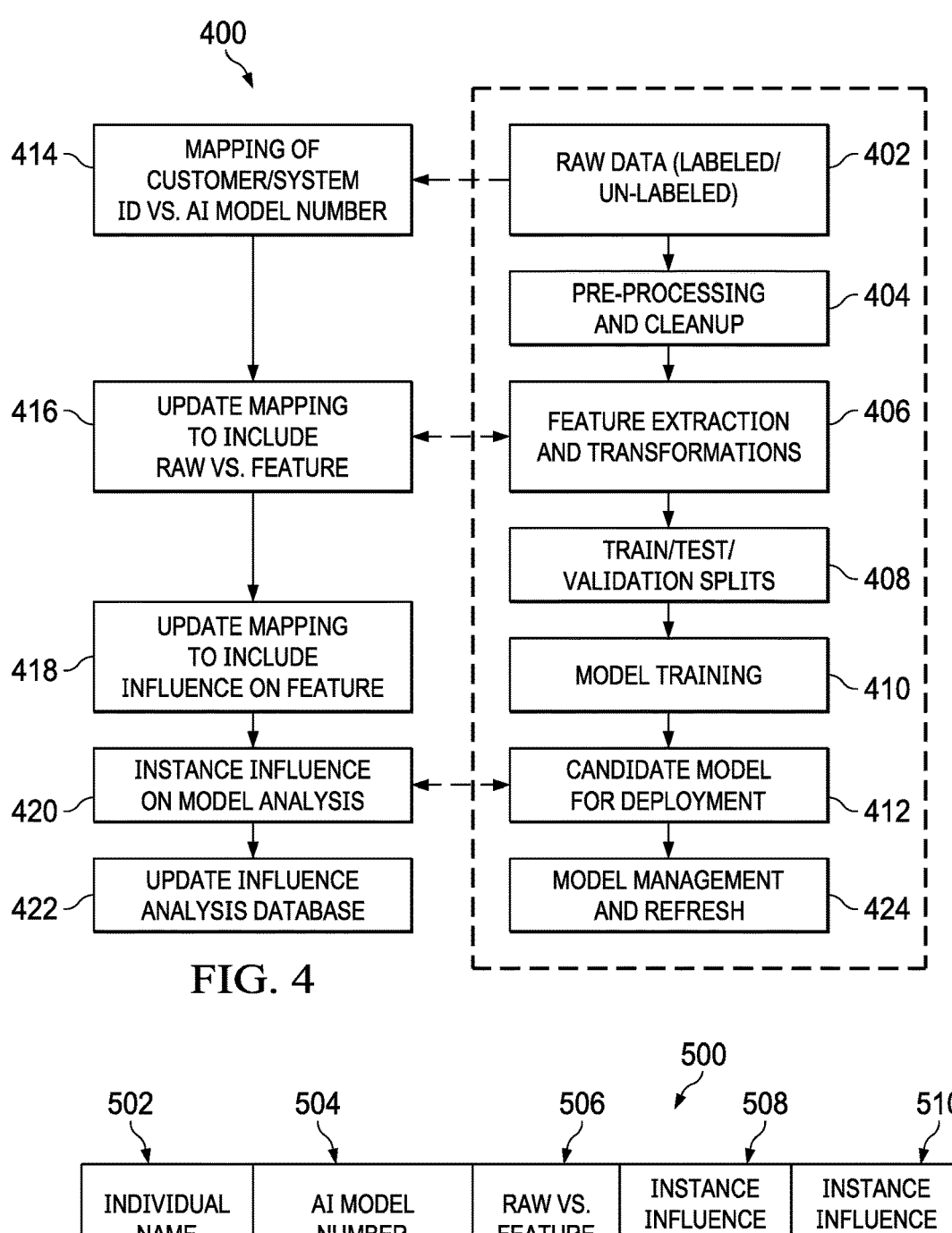

400

| 414 | MAPPING OF CUSTOMER/SYSTEM ID VS. AI MODEL NUMBER |
| 416 | UPDATE MAPPING TO INCLUDE RAW VS. FEATURE |
| 418 | UPDATE MAPPING TO INCLUDE INFLUENCE ON FEATURE |
| 420 | INSTANCE INFLUENCE ON MODEL ANALYSIS |
| 422 | UPDATE INFLUENCE ANALYSIS DATABASE |

| 402 | RAW DATA (LABELED/UN-LABELED) |
| 404 | PRE-PROCESSING AND CLEANUP |
| 406 | FEATURE EXTRACTION AND TRANSFORMATIONS |
| 408 | TRAIN/TEST/VALIDATION SPLITS |
| 410 | MODEL TRAINING |
| 412 | CANDIDATE MODEL FOR DEPLOYMENT |
| 424 | MODEL MANAGEMENT AND REFRESH |

| | INDIVIDUAL NAME | AI MODEL NUMBER | RAW VS. FEATURE | INSTANCE INFLUENCE ON FEATURE | INSTANCE INFLUENCE ON MODEL |
|---|---|---|---|---|---|
| | 502 | 504 | 506 | 508 | 510 |
| 512 | JOHN DOE | AWCC – GAME RECOMMENDER V 1.2 | FEATURE | 0.4% | 0.55% |
| | o o o | o o o | o o o | o o o | o o o |
| 512 | BOB SMITH | CPU OPTIMIZER | FEATURE | 3.7% | 2.8% |

FIG. 5

SYSTEM METHOD AND CODE FOR UN-LEARNING AN INDIVIDUAL FROM AN ARTIFICIAL INTELLIGENCE (AI) MODEL

FIELD

The present disclosure relates generally to Information Handling Systems (IHSs), and more particularly, to a system, method, and code for un-learning and individual from an artificial intelligence (AI) model.

BACKGROUND

Machine learning systems analyze data and establish models to make predictions and decisions. Examples of machine learning tasks include classification, regression and clustering. A predictive engine is a machine learning system that typically includes a data processing framework and one or more algorithms trained and configured based on collections of data. Such predictive engines are deployed to serve prediction results upon request. A simple example is a recommendation engine for suggesting a certain number of products to a customer based on pricing, product availabilities, product similarities, current sales strategy, and other factors. Such recommendations can also be personalized by taking into account user purchase history, browsing history, geographical location, or other user preferences or settings. Some existing tools used for building machine learning systems include Apache Spark Ninth, Apache Mahout, and Scikit-Learn.

Machine learning algorithms may be classified by how they are trained. For example, supervised learning, unsupervised learning, semi-supervised learning, and reinforcement learning include several examples of various training techniques. Training data is used for training the machine learning algorithm. A machine learning model is a result of what is learned from training with the training data, and contains a parameter set for the machine learning algorithm. Neural networks may be used in machine learning. Neural networks may be used in the supervised learning and reinforcement learning space. The effectiveness of a machine learning algorithm is influenced by its accuracy, execution time, storage requirements, and quality of the training data. The expertise and expense required for compiling a representative training set and labeling the data results in the training data and model obtained from the training data are valuable assets.

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, validation set, and/or test set can respectively include pairs of input datasets and expected output datasets that correspond to the respective input datasets.

SUMMARY

According to one embodiment, an information Handling System (IHS) includes computer-executable instructions for receiving one or more individual-specific raw data instances associated with an individual along with other raw data instances that are not associated with the individual. The instructions then perform a native artificial intelligence (AI)

process to generate one or more native features according to the received other raw data instances and the individual-specific raw data instances, and a native AI model from the one or more native features. The instructions also perform a differential AI process to generate one or more differential features according to the received other raw data instances, and a differential model from the one or more differential features in which the differential features are generated without the individual-specific raw data instances. The native features may be compared against the differential features to determine one or more feature influence levels of the individual-specific raw data instance on the native features, while the native model may be compared against the differential model to determine a model influence level of the individual-specific raw data instance on the native model.

According to another embodiment, an IHS-based method includes receiving individual-specific raw data instances associated with an individual in addition to other raw data instances that are not associated with the individual. The method further performs a native artificial intelligence (AI) process to generate one or more native features according to the received other raw data instances and the individual-specific raw data instances, and a native AI model from the one or more native features. The method also performs a differential AI process to generate one or more differential features according to the received other raw data instances, and a differential model from the one or more differential features in which the differential features are generated without the individual-specific raw data instances. The native features may be compared against the differential features to determine one or more feature influence levels of the individual-specific raw data instance on the native features, while the native model may be compared against the differential model to determine a model influence level of the individual-specific raw data instance on the native model.

According to yet another embodiment, a memory storage device of an IRS may include instructions for receiving one or more individual-specific raw data instances associated with an individual along with other raw data instances that are not associated with the individual. The instructions then perform a native artificial intelligence (AI) process to generate one or more native features according to the received other raw data instances and the individual-specific raw data instances, and a native AI model from the one or more native features. The instructions also perform a differential AI process to generate one or more differential features according to the received other raw data instances, and a differential model from the one or more differential features in which the differential features are generated without the individual-specific raw data instances. The native features may be compared against the differential features to determine one or more feature influence levels of the individual-specific raw data instance on the native features, while the native model may be compared against the differential model to determine a model influence level of the individual-specific raw data instance on the native model.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is an example AI training method that may be performed by native AI service and differential AI influence monitoring service for generating the feature influence metric and model influence metric according to one embodiment of the present disclosure.

FIG. 5 illustrates an example database that may be used by the differential AI influence monitoring service for recording individual influence levels that may be imparted on the native features and native AI model generated by the native AI service.

DETAILED DESCRIPTION

Figure 1:
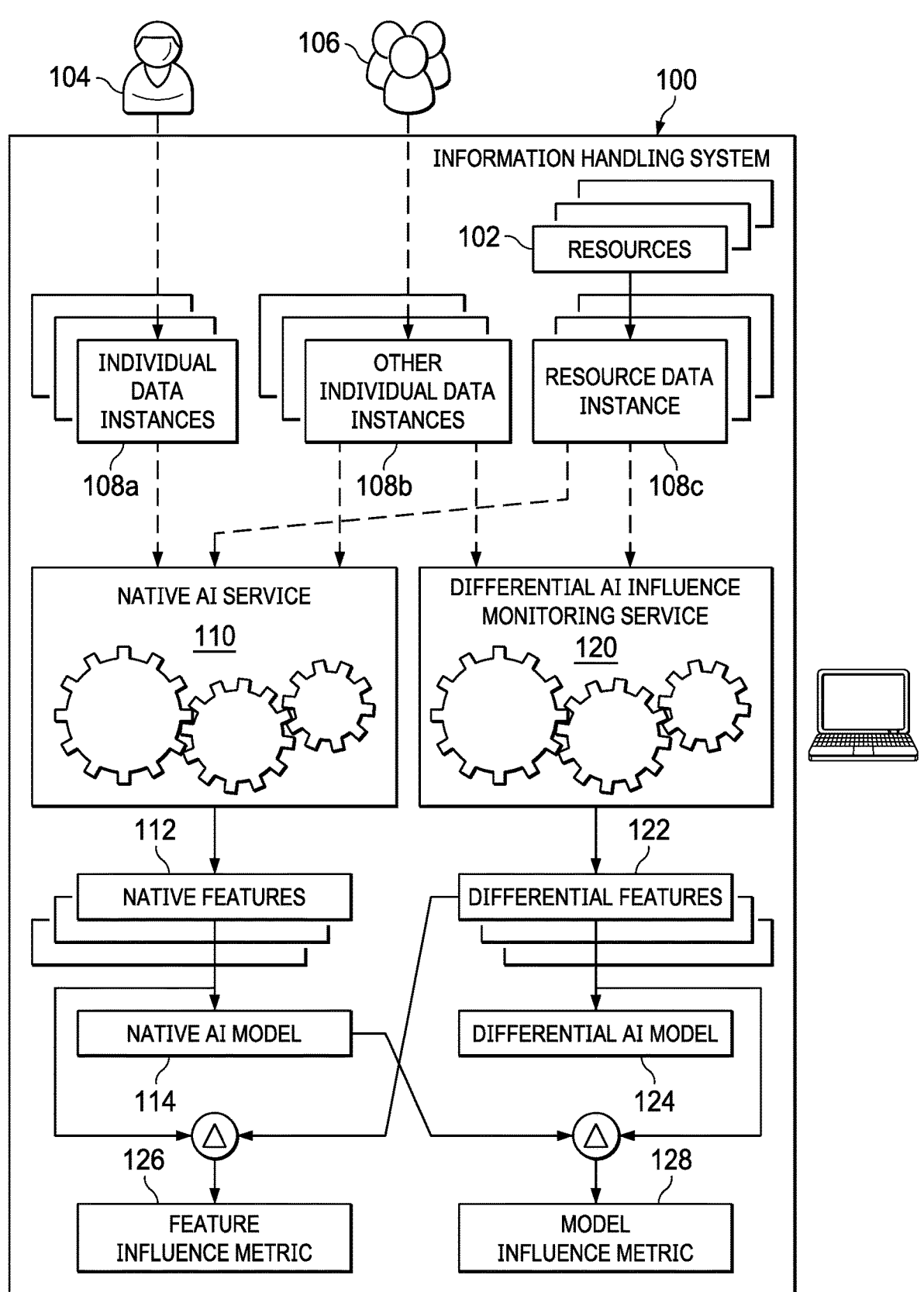
FIG. 1 illustrates an example information handling system (IHS) that may be implemented with an AI model un-learning system according to one embodiment of the present disclosure.

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Today's users now interact with IHSs on a daily basis. Each of these interactions, whether accidental or intended, poses some degree of security risk, depending on the behavior of the user and/or the actions of other potential malicious entities. As such, IHS users have become aware of the need for privacy. To respond to this need, the General Data Protection Regulation (GDPR) for members of the European Union (EU) was created.

The GDPR, as well as other legislative bodies across the globe, have codified a user's 'Right to be Forgotten' aspect of privacy. According to the 'Right to forget' aspect of privacy, personal data must be erased immediately where the data is no longer needed for its original processing purpose, or the data subject has withdrawn his/her consent (e.g., deleting a user's account, unsubscribing the user, etc.). Organizations are complying with 'right to forget' by creating policies and tools for customers to, for example, delete their own data, create data classifications and set expiration dates according to a classification of data, and disable processing of personal data by third parties.

Conventional activities within the industry have been focused on 'data deletion'. Many artificial intelligence (AI) models (Machine Learning (ML), Deep Learning, Heuristics, etc.) are typically trained using relatively large datasets. Although these models may not remember individual users after training is complete, the model outcomes and learning are, in many cases, shaped by the user's data, including user features derived from the data.

Certain class of models (e.g., K—Nearest Neighbors, Support Vector Machines, etc.) may be susceptible to using individual data points that create classification boundaries during training. As such, their outcome can be strongly influenced by single or few data points. As will be described in detail herein below, embodiments of the present disclosure may provide a 'right to be un-learned' aspect of user privacy, which is essentially an extension of the established 'right to be forgotten' as codified by the PDGR and other governmental entities. In general, the 'right to be un-learned' involves a process whereby artifacts from AI models, which are learned using user's data, are removed. Embodiments provide a method and architecture to track, tag, and un-learn some, most, or all types of AI use cases, including recommendation engines, sales promotion ranking, personalization of various forms of data, and the like. Additionally, the un-learning of user data may be triggered based on user's request and/or consent.

Conventional techniques of un-learning user data has heretofore been a cumbersome endeavor. Such conventional techniques have involved Identifying each record with a unique ID associated with each individual, and maintaining a database to track which data was used to train which models (by model ID and version). Based on customer consent, the data is removed from the training set for all associated models, and those models re-trained and re-deployed back in the field or cloud API. Nevertheless, this conventional approach has several drawbacks. First, this approach would be difficult to scale and cost prohibitive on an enterprise wide basis involving numerous individuals. Even if implemented on an individual basis, since most AI algorithms are integrated on personal devices (e.g., workstations, notebook computers, tablets, etc.) with host software, re-deploying the models would more than likely cause poor customer experience due to frequent updates to models or entire software applications. From a technical basis, data is often pre-processed and aggregated before being used in AI models. That is, the number and type of applications used by individual users may be aggregated (means, medians) by hardware configuration, location, persona before modeling. Depending on the aggregating metric, the overall influence will, in many cases, be different. An exhaustive approach would needed to track each feature derived from the data. With current scale of data collection and AI model proliferation, this approach would be unscalable. For example, AI models are currently deployed on over 20 million systems and continually growing.

FIG. 1 illustrates an example information handling system (IHS) 100 that may be implemented with an AI model un-learning system according to one embodiment of the present disclosure. As shown, IHS 100 includes various resources 102, such as CPU resources, GPU resources, storage resources, communication resources (e.g., Ethernet, USB, etc.), software resources (e.g., operating system (OS), one or more applications executed on IHS, drivers, etc.), and various platform resources (e.g., communication systems, peripheral devices, power/thermal control systems, etc.) that may be used to perform the various functions of the IHS 100. The IHS 100 is also configured with a native AI service 110 that receives individual data instances 108a associated with activities and/or behaviors of an individual 104, other individuals data instances 108b associated with operation of the resources 102 of the IHS, and if the IHS 100 is used by multiple other individuals 106, and/or resource data instances 108c associated with their activities and/or behavior on the IHS 100. The individual data instances 108a, other individuals data instances 108b, and resource data instances 108c may collectively be referred to as raw data instances in that they exist in a form prior to any processing by the system 100.

The native AI service 110 generates one or more native features 112 from the received raw data instances 108*a*, 108*b*, 108*c*, and a native AI model 114 from the one or more native features 112. According to embodiments of the present disclosure, a differential AI influence monitoring service 120 may be provided that receives data records 108*b*, and 108*c* to generate one or more differential features 122, and a differential AI model 124 from the one or more differential features 122. From the generated differential features 122 and differential AI model 124, a feature influence metric 126 and model influence metric 128 can be derived that indicate a level of influence of the individual's user data on the native features 112 and native AI model 114, respectively.

A raw data instance 108 generally refers to a single point of information or an action performed by either of the individual 104, other individuals 106*c*, or the resources 102 of the IHS 100. The raw data instance 108 can be univariate (e.g., user's income) or may be multivariate (e.g., users income, age, gender, location). A feature generally refers to a variable or attribute that is used in an AI model. A feature can include raw data from each raw data instance 108 (e.g., each user's income) or a pre-processed metric (e.g., average income of users in US).

The individual feature influence metric 126 and individual AI model influence metric 128 may be useful for indicating a level of influence that an individual's actions and/or behaviors has upon the native AI service 110. This information may provide numerous benefits. One particular benefit may include the ability to un-learn the individual's raw data instances 108*a* from the native features 112 and native AI model 114 by simply replacing the stored native features 112 and native AI model 114 generated by the native AI service 110 with the differential features 122 and differential AI model 124. Thus, the raw data instances 108*a* associated with the individual 104 can be un-learned in a relatively quick and efficient manner. From this point onward, the native features 112 and native AI model 114 may continually be updated for ongoing learning provided by new raw data instances 108*b*, 108*c* obtained from the resources 102 of the IHS 100 and other individuals 106*e* of the IHS 100 absent the raw data instances 108*a* from the individual 104 who has been 'un-learned'.

The individual feature influence metric 126 and individual AI model influence metric 128 may be useful for other purposes. For example, the individual feature influence metric 126 and individual AI model influence metric 128 may be useful for indicating, to the individual, his or her contribution to a certain feature of the native AI model 114. Additionally, the individual feature influence metric 126 and individual AI model influence metric 128 of a certain group of individuals may be combined to identify their combined contribution to a certain feature of the native AI model 114. Furthermore, two or more groups of individuals may be compared against one another to identify, among other things, who has more influence of the features of the native AI model 114.

Figure 2:
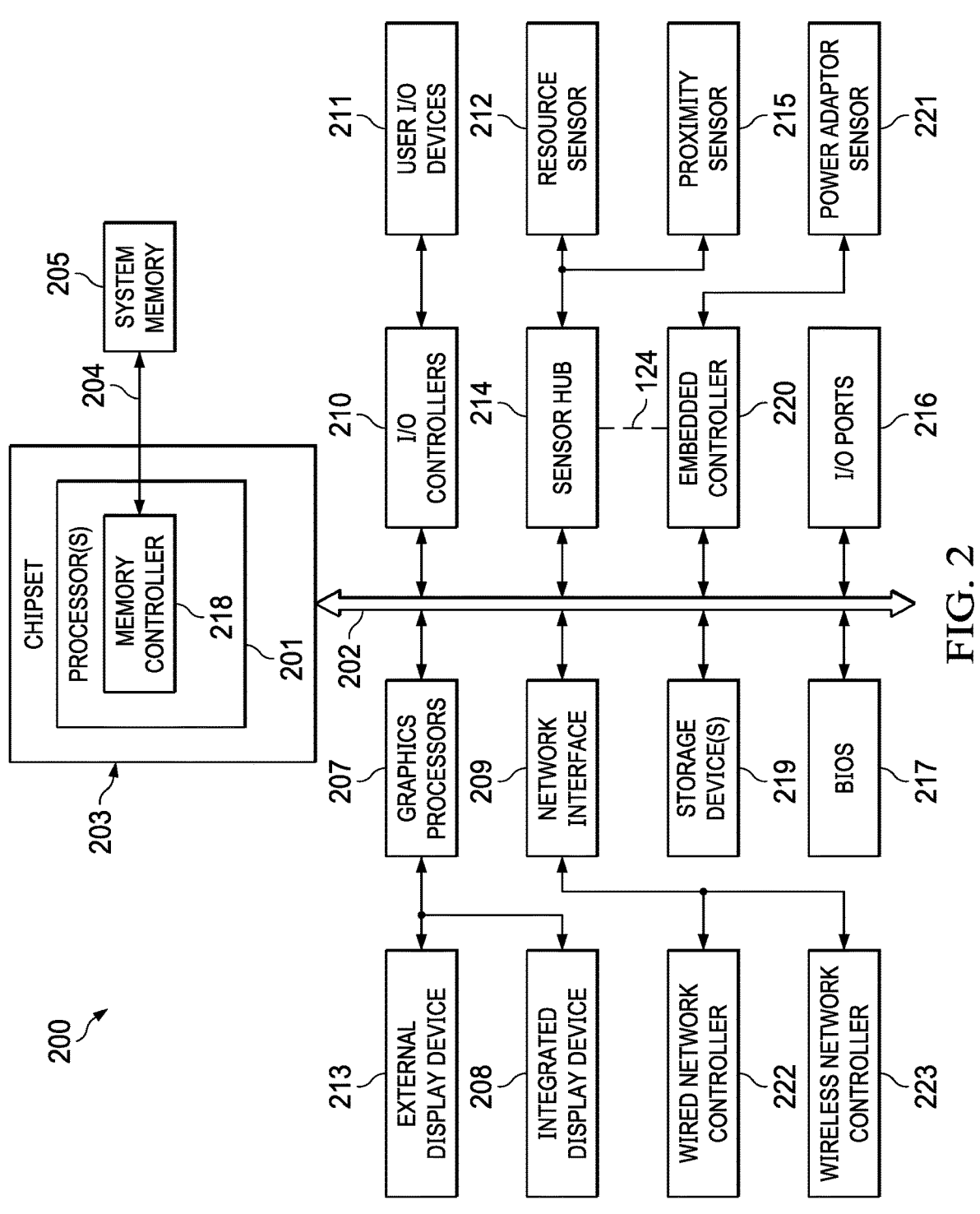
FIG. 2 is a block diagram illustrating components of an example IHS that may be configured to execute the differential AI influence monitoring service according to one embodiment of the present disclosure.

FIG. 2 is a block diagram illustrating components of an example IHS 200 that may be configured to execute the differential AI influence monitoring service according to one embodiment of the present disclosure. IHS 200 may be incorporated in whole, or part, as IHS 100 of FIG. 1. As shown, IHS 200 includes one or more processors 201, such as a Central Processing Unit (CPU), that execute code retrieved from system memory 205. Although MS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O 216 ports may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network interface Controllers (NICs) 222 and 223, each of which may implement the hardware required for communicating via a specific networking technology, such as BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IRS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 100.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In sonic embodiments, EC 220 and sensor hub 214 may communicate via an out-of-band signaling pathway or bus 124.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
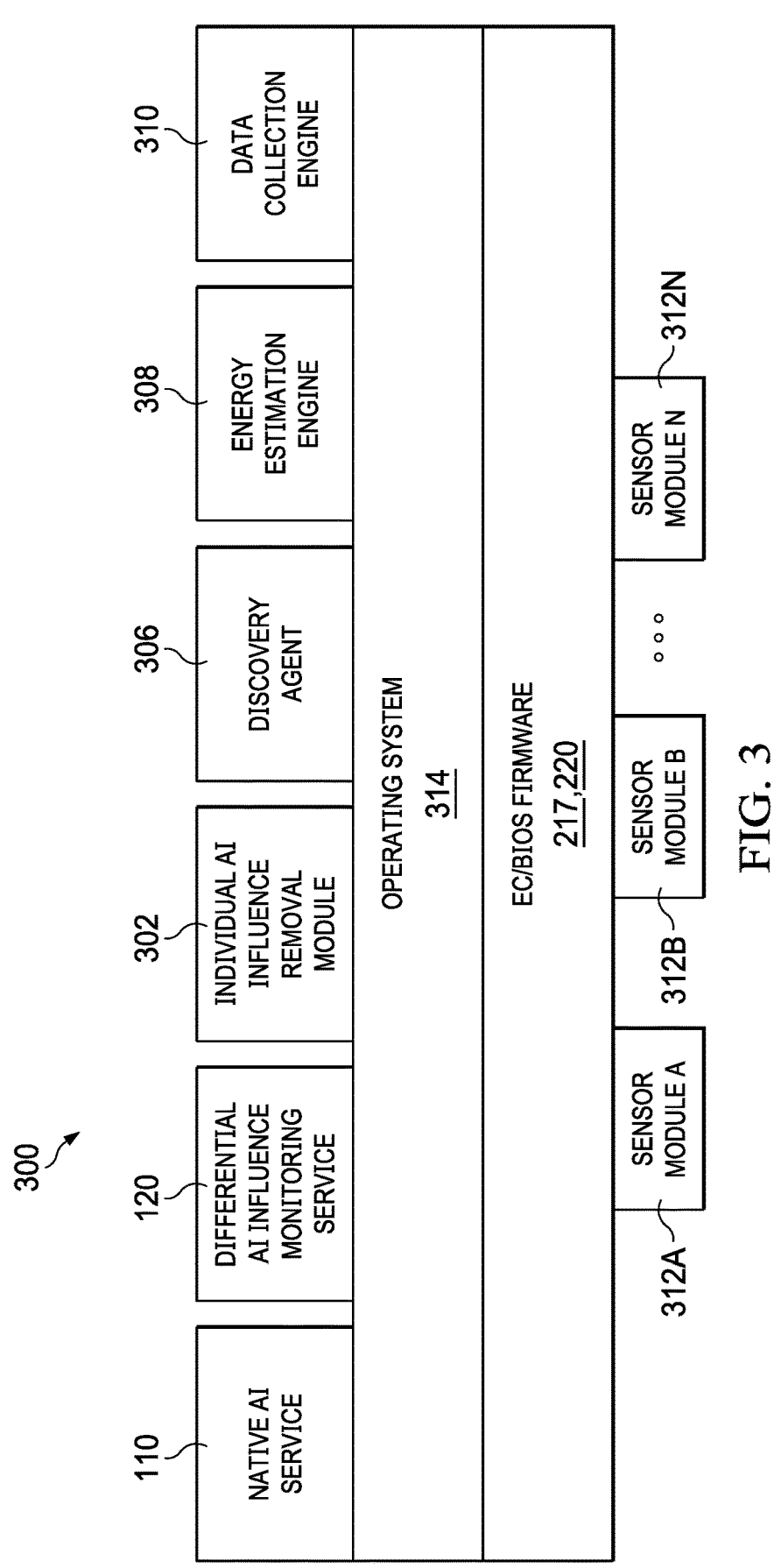
FIG. 3 is a block diagram illustrating an example of a software system produced by IHS for providing the AI model un-learning system according to one embodiment of the present disclosure.

FIG. 3 is a block diagram illustrating an example of a software system 300 produced by IHS 100 for providing the AI model un-learning system according to one embodiment of the present disclosure. In some embodiments, each element of software system 300 may be provided by IHS 100 through the execution of program instructions by one or more logic components (e.g., CPU 201, BIOS 217, EC 220, etc.) stored in memory (e.g., system memory 205), storage device(s) 219, and/or firmware. As shown, software system 300 includes an operating system (OS) 314 that supports differential AI influence monitoring service 120, native AI service 110, individual AI influence removal module 302, a discovery agent 306, an energy estimation engine 308, and a data collection engine 310. Software system 300 may also include one or more sensor modules or drivers $312_A$-$312_N$, which may abstract and/or interface with hardware resource sensor 212, proximity sensor 215, and power adapter sensor 221, and the like.

In one embodiment, native AI service 110 and/or differential AI influence monitoring service 120 may include features, or form a part of, the DELL PRECISION OPTIMIZER. The DELL PRECISION OPTIMIZER dynamically configures the IHS 100 to optimize its performance. It also keeps the user informed of any available software updates and applies them when configured to do so. Additionally, it may include a tracking subsystem that can gather data about the IHS 100 and help identify potential problems. In one embodiment, differential AI influence monitoring service 120 may be provided as a cloud service in which it communicates through a publicly available communication network, such as the Internet, to communicate with the IHS 100 and its associated resources 102 for un-learning the individual's raw data instances 108a from the native features 112 and native AI model 114. For example, the differential AI influence monitoring service 120 may be provided as a subscription service, in which users of IHS 100 may register for providing the un-learning feature such as described herein.

The differential AI influence monitoring service 120 is executed by OS 314, which is turn supported by EC/BIOS instructions/firmware 217, 220, EC/BIOS firmware 217, 220 is in communications with, and configured to receive data collected by, one or more sensor modules or drivers $312_A$-$312_N$, which may abstract and/or interface with hardware resource sensor 212, proximity sensor 215, and power adapter sensor 221.

Discovery agent 306 is provided to discover the resources 102 configured in system, and report the results to the differential AI influence monitoring service 120. For example, discovery agent 306 may access a firmware portion of IHS 100 to obtain the resource data for those resources registered in its BIOS 217, and stored in a memory 205 of IHS 100. Within this disclosure, resource data generally refers to any information that may be used to access and/or manage its associated resource (e.g., acquire parametric data, change its configuration, etc.). For any non-registered (unsupported/unqualified) resource, however, its resource data may be unknown. That is, no data or insufficient data for that resource may be available in BIOS 217. In such a case, differential AI influence monitoring service 120 may issue or broadcast inquiry messages to those resources in IHS 100, and process response messages to identify those non-registered resources in IHS 100, and report the results back to differential AI influence monitoring service 120 so that they can be registered for use with differential AI influence monitoring service 120.

In various embodiments, software system 300 also includes an energy estimation engine 308, such as the MICROSOFT E3 engine, which is configured to provide energy usage data broken down by applications, services, tasks, and/or hardware in an IHS. In some cases, energy estimation engine 308 may use software and/or hardware sensors configured to determine, for example, whether an application is being executed in the foreground or in the background (e.g., minimized, hidden, etc.) of the IHS's graphical user interface (GUI).

Data collection engine 310 may include any data collection service or process, such as, for example, the DELL DATA VAULT configured as a part of the DELL SUPPORT CENTER that collects information on system health, performance, and environment. In some cases, data collection engine 310 may receive and maintain a database or table that includes information related to IHS hardware utilization (e.g., by application, by thread, by hardware resource, etc.), power source (e.g., AC power (adapter plugged in) or battery power (adapter unplugged)), and the like. In one embodiment, both native AI service 110 and differential AI influence monitoring service 120 may query data collection engine 310 to, among other things, acquire data for learning the behavior of the various resources 102 of the IHS 100.

In general, native AI service 110 gathers telemetry data from the individual 104, other individuals 106, resources 102, and sensors $312_1$-$312_N$ to characterize their resource utilization. For example, native AI service 110 may generate one or more performance features from telemetry data gathered from energy estimation engine 308, data collection engine 310, and/or directly from sensors $312_1$-$312_N$ configured in IHS 100 to generate one or more profile recommendations associated with the performance of IHS 100. Once native AI service 110 has collected characteristics over a period of time, it may then process the collected data using statistical descriptors to extract the application performance features of the IHS 100. For example, native AI service 110 may monitor the resources 102 over time to estimate its resource usage with respect to various aspects, such as which actions performed by IHS 100 cause certain resources to encounter loading, and a time period of day in which these actions are encountered. Once native AI service 110 has collected characteristics over a period of time, it may then process the collected data using statistical descriptors to extract the performance features associated with IHS 100. From these performance features, the native AI service 110 may generate profile recommendations that are used to optimize the IHS 100, native AI service 110 may use any suitable AI-based learning algorithm such as, for example, a Bayesian algorithm, a Linear Regression algorithm, a Decision Tree algorithm, a Random Forest algorithm, a Neural Network algorithm, or the like.

Native AI service 110 and differential AI influence monitoring service 120 both perform a similar AI process; the only difference being that the AI process performed by differential AI influence monitoring service 120 is void of any raw data instances 108a associated with the individual 104. As such, the difference between the resulting differential features 122 and the native features 112 will indicate a level of influence that the individual has incurred on native features 112. Additionally, the difference between the resulting differential AI model 124 and the native AI model 114 will indicate a level of influence that the individual has incurred on native AI model 114. Given this unique information, un-learning the individual's raw data instances 108a from the working native AI service 110 becomes a relatively straight-forward task of simply replacing the stored native features 112 and native AI model 114 generated by the native AI service 110 with the differential features 122 and differential AI model 124.

As shown, differential AI influence monitoring service 120 is stored and executed on the IHS 100 it is configured to provide optimization services for. In other embodiments, differential AI influence monitoring service 120 may be a cloud provided service in which it communicates through a publicly available communication network, such as the Internet, to communicate with resources 102 for monitoring an influence that an individual may impart on a native AI model 114. For example, the differential AI influence monitoring service 120 may be provided as a subscription service, in which users of IHS 100 may register for providing individual influence monitoring and remediation such as described herein.

FIG. 4 is a example AI training method 400 that may be performed by native AI service 110 and differential AI influence monitoring service 120 for generating the feature influence metric 126 and model influence metric 128 according to one embodiment of the present disclosure. In general, steps 402 through 412 described actions that may be taken by native AI service 110, while steps 414 through 422 describe actions that may be taken by differential AI influence monitoring service 120.

Initially, native AI service 110 and differential AI influence monitoring service 120 may be started automatically after OS 314 has been initially started, such as when OS 314 is started (e.g., bootstrapped) by system BIOS 217. In another embodiment, native AI service 110 and differential AI influence monitoring service 120 may be started manually, such as in response to user input. In yet another embodiment, if native AI service 110 and differential AI influence monitoring service 120 is configured as a cloud service, they may be started by receiving a request message from IHS 100 to the cloud service followed by sending a response message to IHS 100 for initiating a communication channel between IHS 100 and the cloud service.

At step 402, native AI service 110 receives raw data instances 108a, 108b, 108c from the individual 104, other individuals 106b, along with the resources 102 of the IHS 100. Thereafter at step 404, native AI service 110 performs pre-processing and cleanup of the received raw data instances 108a, 108b, 108c. Pre-processing and cleanup, for example, may involve removing extraneous data, normalizing telemetry information included in the data, formatting the data into a suitable form to be used by the native AI service 110.

At step 406, native AI service 110 extracts native features 112 from the pre-processed and cleaned up raw data instances 108a, 108b, 108c. Features may include any suitable variable or attribute that may be used in a AI model. For example, a feature can include raw data from each instance each user's income), or a pre-processed metric average income of individual 104 and other individuals 106).

At step 408, native AI service 110 may optionally perform certain train/test/validation splits on the native features 112 derived at step 406. The splits, also referred to as cross-validation splits may be performed, among other things, to increase the reliability of the AI model, but often do result in relatively longer execution times. Given a particular example, a cross-validation split may involve splitting the native features 112 into k folds (e.g., 10 folds) to build k classifiers. The variable 'k' can be set by user input or by a suitable automated process. Thereafter at step 410, native AI service 110 generates the native AI model 114 followed by performing any cross validation/regularization techniques. The native AI model 114 may be generated, and cross validation/regularization techniques performed in any suitable manner that is known to those skilled in the art.

At step 412, native AI service 110 deploys the native AI model 114 to the IHS 100. For example, the native AI service 110 may generate one or more profile recommendations that may be applied to certain resources 102 of the IHS 100 for its optimization. These profile recommendations may include, for example, adjusting one or more of a frame rate, often rated in frames per second (FPS), a refresh rate, or a computational frame rate of a GPU resource, adjusting an overclocking or underclocking level of a CPU resource, and/or adjusting a write optimized setting or a read optimized setting of a storage resource. The native AI service 110 then continues processing at step 402 to update (e.g., refresh) the native features 112 and native AI model 114 with new raw data instances 108a, 108b, 108c received from the individual 104, other individuals 106b, and resources 102 of the IHS 100.

Steps 414 through 422 generally describe certain steps that may be performed by the differential AI influence monitoring service 120. As mentioned previously, native AI service 110 and differential AI influence monitoring service 120 both perform a similar AI process with essentially the only difference being that the AI process performed by the differential AI influence monitoring service 120 is void of any raw data instances 108a associated with the individual 104. For example at step 414, the differential AI influence monitoring service 120 receives raw data instances 108b and 108c from the other individuals 106, along with the resources 102 of the IHS 100 to the exclusion of raw data instances 108a associated with the individual 104, and at step 416, the differential AI influence monitoring service 120 extracts differential features 122 from the received raw data instances 108b and 108c.

At step 418, the differential AI influence monitoring service 120 records a feature influence metric 126 in a database 500 or other suitable storage medium, such as a lookup table, or a comma separated values (CSV) file. For example, differential AI influence monitoring service 120 may obtain a difference measurement between a particular feature derived at step 416 with a similar feature derived by the native AI service 110 at step 406, and store the measurement as a feature influence metric 126 in a database 500 as will be described in detail herein below. At step 420, the differential AI influence monitoring service 120 determines a differential AI model 124 from the extracted differential features 122, and at step 422, the differential AI influence monitoring service 120 records the model influence metric 128 in the database 500.

The feature influence metric 126 and model influence metric 128 may comprise any suitable format that indicates a level of influence upon the native features 112 and native AI model 114 imparted by the individual 104. In one embodiment, the feature influence metric 126 and model influence metric 128 are unit-less values that indicate a certain part or portion that the individual imparts onto the native features 112 and native AI model 114 of the native AI service 110. For example, the feature influence metric 126 and model influence metric 128 may be percentage values or other suitable format that indicates a factional value of influence.

When step 422 has been completed, processing continues at step 402 to continually update the native AI model 114 of the native AI service 110 and differential AI model 124 in an ongoing, continuous manner. Nevertheless, when use of the method 400 is no longer needed or desired, the method 400 ends.

Although FIG. 4 describes one example of a method 400 that may be performed for generating differential features 122 and a differential AI model 124, the features of the disclosed method 400 may be embodied in other specific forms without deviating from the spirit and scope of the present disclosure. For example, the method 400 may perform additional, fewer, or different operations than those operations as described in the present example. As another example, the steps of the method 400 described herein may be performed by a computing system other than the IHS 100, such as via a cloud service as described above.

FIG. 5 illustrates an example database 500 that may be used by the differential AI influence monitoring service 120 for recording individual influence levels that may be imparted on the native features 112 and native AI model 114 generated by the native AI service 110. As shown, database 500 includes several fields for each differential feature 122 derived by differential AI influence monitoring service 120. The fields may include, for example, an individual name field 502, an AI model name field 504, a raw data record versus feature field 506, an influence feature metric field 508, and an influence model field 510.

The individual name field 502 indicates a name of the individual or other suitable unique identifier that uniquely identifies the individual 104, such as from other individuals 106 who may access the IHS 100. The raw data record versus feature field 506 indicates whether the differential feature constitutes a raw data instance 108 or a feature derived by the differential AI influence monitoring service 120. The influence feature metric field 508 and the influence model field 510 indicate a level of influence to the native feature 112 and the influence to the native AI model 114, respectively, that the individual imparts to the native feature 112 indicated in the raw data record versus feature field 506.

The AI model name field 504 indicates a name or reference to a native AI service 110 executed on the IHS 100. Since modem day IHSs 100 often have several AI services 110 that may be concurrently installed on, and function with one another on the IHS 100, a differential AI influence monitoring service 120 may be instantiated for each native AI service 110 for which monitoring of a feature influence metric 126 and model influence metric 128 can be desired. For example, if a particular IHS 100 has a quantity of seven AI services 110 installed and operational, up to seven differential AI influence monitoring services 120 may be instantiated to derive a feature influence metric 126 and model influence metric 128 for each of the seven AI services 110. Nevertheless, it should be appreciated that fewer than the total number of installed AI services 110 may have a differential AI influence monitoring service 120 installed for monitoring its feature influence metric 126 and model influence metric 128 of each individual 104. For example, only six or fewer differential AI influence monitoring services 120 may be instantiated for monitoring a feature influence metric 126 and model influence metric 128 of a corresponding six or fewer of the seven AI services 110 installed on the IHS 100.

Although FIG. 5 illustrates one example of a database 500 that may be used for recording individual influence levels that may be imparted on the native features 112 and native AI model 114 generated by a native AI service 110, it should be appreciated that other example databases may have additional, fewer, or different features than those explicitly described herein. For example, the database 500 may include additional fields for indicating other influence metrics, such as a rate at which the feature influence metric 126 and model influence metric 128 increase or decrease over certain periods of time. As another example, the database 500 may include additional fields for indicating certain threshold values to be associated with each feature influence metric 126 and/or model influence metric 128.

Figure 6:
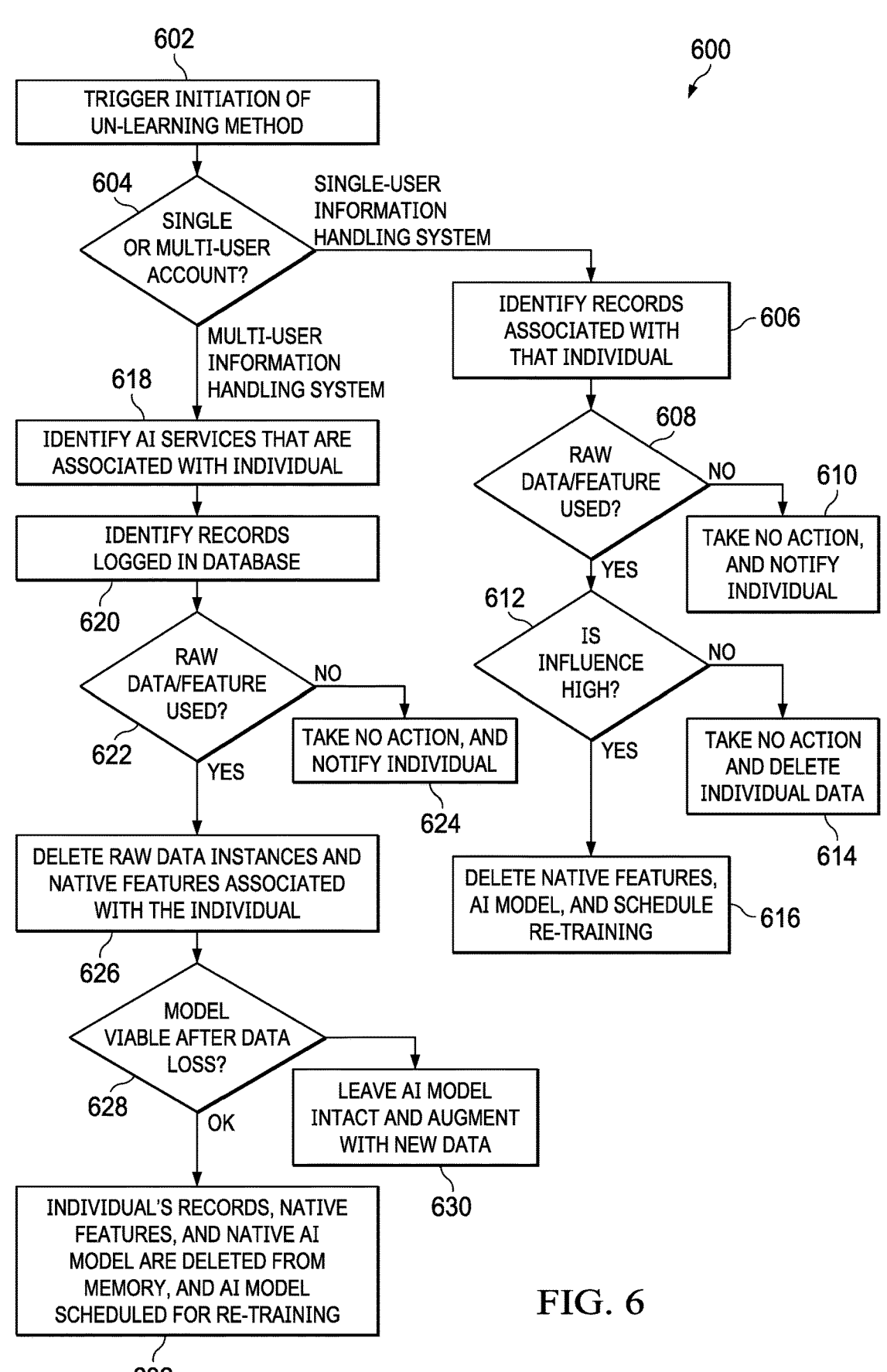
FIG. 6 illustrates an example un-learning method that may be performed to mitigate the influence imparted by the individual on a native AI service according to one embodiment of the present disclosure.

FIG. 6 illustrates an example un-learning method 600 that may be performed to mitigate the influence imparted by the individual 104 on a native AI service 110 according to one embodiment of the present disclosure. Initially, the AI training method 400 as described above has been performed to generate the database 500 indicating how the individual may be influenced certain of its native features 112 and native AI model 114.

At step 602, the un-learning method 600 receives a triggering event for performing the un-learning method 600. In one embodiment, the un-learning method 600 receives user input requesting that the influence of the individual 104 be removed from the native AI model 114. In another embodiment, the request may include certain ones of all of the native AI models 114 existent in the IHS 100 to be removed.

At step 604, the un-learning method 600 determines whether the request originated from a single user account or a multi-user account. For example, the IHS 100 may be one (e.g., notebook computer, personal home computer, notepad, etc.) in which only a single user typically accesses its resources. As such, the request may be considered to originate from a single user account. Conversely, if the IHS 100 is one (e.g., corporate computer, mainframe computer, cloud-based computer, etc.) possessing more than one account, the request could then be considered to be a multi-user account. The un-learning method 600 may use any suitable technique for determining whether the request originates from a single user account or a multi-user account. For example, the un-learning method 600 may examine the database 500 to determine whether records exist more than one individual to determine whether the request is associated with a single user or a multi-user account. Nevertheless, if the request originates from a single user account, processing continues at step 606; otherwise, the request originates from a multi-user account, and processing continues at step 618.

At step 606, the un-learning method 600 identifies records 512 associated with that individual 104 that have been logged in database 500. Then at step 608, the un-learning method 600 determines whether, for each identified record 500, the feature was used, to generate the native AI model 114 by the native AI service 110. If not, processing continues at step 610 in which no action is taken and the individual 104 is notified, such as by generating a message on a graphical user interface (GUI) that their personal data was not used to generate the native AI model 114. Taking no action generally refers to the act of not deleting any existing native features 112 or the native AI model 114 associated with the AI service 110.

If, however, at least one of the native features 112 was used, processing continues at step 612 in which the un-learning method 600 determines whether any of the used native features 112 had a significant bearing (e.g., had a relatively high level of influence) on the native AI model 114. For example, the un-learning method 600 may compare the feature influence metric 126 and model influence metric 128 against certain specified threshold values that are set according to certain factors. Those factors may be based upon, for example, a quantity of other individuals 106 and/or a classification of other individuals 106 (e.g., family members, friends, social club, working colleagues, etc.) involved with generation of the native AI model 114, a certain classification of activities (e.g., work activities, personal activities, travel activities, etc.) and/or a time period of the day (e.g., morning, afternoon, evening, nighttime, etc.) in which the native features 112 associated with the individual 104 were performed. To provide a particular example, if a differential feature 122 associated with the individual 104 was mostly performed in the process of conducting a work activity, the threshold influence value may be set to 3.0 percent, while if the differential feature 122 was mostly performed in the process of conducting a personal activity, the threshold influence value may then be set to 7.0 percent.

Nevertheless, if the differential features 122 were determined to not have a significant bearing (e.g., high level of influence) on the native AI model 114, processing continues at step 614 in which the individual's records 512 are deleted from memory. At this point, it may not be necessary to delete the native features 112 and the native AI model 114 because the actions of the individual 104 did not contribute any significant influence on the native AI model 114. If, however, the differential features 122 were determined to have a significant bearing on the native AI model 114, processing continues at step 616 in which the individual's records 512, native features 112, and native AI model 114 are deleted from memory, and the native AI service 110 scheduled to re-train a new native AI model 114. Thus, not only are the data records 512 associated with the individual 104 deleted from memory, the influence imparted onto the native AI model 114 by that individual 104 may also be deleted in a manner such that the individual 104 is "un-learned" from the system.

Steps 618-632 describe actions that may be taken by the un-learning method 600 in cases where the request is considered to originate from a multi-user account. At step 618, the un-learning method 600 determines which AI services 110 may be associated with the individual 104. For example, the un-learning method 600 may scan the database 500 to identify those AI services 110 that may have been affected by the individual 104 (i.e., those records 500 indicating an association between the individual 104 and those AI services 110). Once identified, the un-learning method 600 may perform steps 620-632 for each of those AI services 110.

At step 620, the un-learning method 600 identifies records 512 associated with that individual 104 that have been logged in database 500. Then at step 622, the un-learning method 600 determines whether, for each identified record 512, the feature was used, to generate the native AI model 114 by the native AI service 110. If not, processing continues at step 624 in which no action is taken and the individual 104 is notified (e.g., via a GUI popup window) that their personal data was not used to generate the native AI model 114. If, however, at least one of the native features 112 was used, processing continues at step 626 in which the un-learning method 600 deletes the raw data instances 108*a* and native features 112 associated with the individual 104.

At step 628, the un-learning method 600 determines, for each native AI service 110, whether its associated native AI model 114 would still be viable following deletion of the individual's raw data instances 108 and native features 112. That is, the un-learning method 600 determines whether each native AI service 110 used in the IHS 100 is significantly affected to a certain level by the raw data instances 108 and native features 112 of the individual 104 so that its deletion is warranted. To accomplish this, the un-learning method 600 may compare the feature influence metric 126 and model influence metric 128 associated with the native AI service 110 against certain specified threshold values that are set according to certain factors, such as described above with respect to step 612.

Nevertheless, if the native AI model 114 is determined to not be significantly impacted by the raw data instances 108 and native features 112 of the individual 104, processing continues at step 630 in which the native AI model 114 is left intact (e.g., not deleted) and continually augmented with new raw data instances 108 and native features 112 from other individuals 106 and the resources 102 of the IHS 100. The native AI model 114 is not deleted because the actions of the individual 104 did not contribute any significant influence on the native AI model 114. If, however, the differential features 122 were determined to have a significant bearing on the native AI model 114, processing continues at step 632 in which the individual's records 512, native features 112, and native AI model 114 are deleted from memory, and the native AI service 110 scheduled to re-train a new native AI model 114. Thus, the data records 512 associated with the individual 104 are deleted from memory, and the individual 104 is "un-learned" from the system.

The aforedescribed un-learning method 600 may be repeatedly performed each time an individual 104 requests that they be "un-learned" from the one or more AI services 110 of the IHS 100. Nevertheless, when use of the un-learning method 600 is no longer needed or desired, the un-learning method 600 ends.

Although FIG. 6 describes one example of a process that may be performed for un-learning an individual 104 from one or more AI services 110 of the IHS 100, the features of the disclosed process may be embodied in other specific forms without deviating from the spirit and scope of the present disclosure. For example, the method 600 may perform additional, fewer, or different operations than those operations as described in the present example. As another example, one or more of the steps of the process described herein may be performed by a computing system other than the IHS 100, such as by a cloud-based service that is accessed from a publicly accessible network (e.g., the Internet).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
at least one processor; and
at least one memory coupled to the at least one processor, the at least one memory configured with program instructions stored thereon that, upon execution by the at least one processor, cause the IHS to:
receive one or more individual-specific raw data instances associated with an individual, wherein the individual comprises a multi-user account;
receive a plurality of other raw data instances associated with individuals other than the individual;
receive a plurality of individual-specific resource data instances comprising measurements captured by sensors configured in the IHS;
perform a native artificial intelligence (AI) process to generate one or more native features in accordance to the received other raw data instances, the individual-specific raw data instances associated with the multi-user account, and the individual-specific resource data instances, and generate a trained native AI model from the one or more native features, the trained native AI model configured to generate one or more profile recommendations determined to optimize IHS performance and energy usage, wherein the one or more profile recommendations are determined by the trained native AI model as a function of IHS performance and energy usage feature input derived from telemetry data that includes measurements captured by the sensors configured in the IHS, wherein the one or more profile recommendations comprise one or more of: adjust one or more of a frame rate of a display resource, a refresh rate of a display resource, a computational frame rate of a GPU resource, an overclocking or underclocking level of a CPU resource, or a write optimized setting or a read optimized setting of a storage resource;
perform a differential AI process to generate one or more differential features in accordance to the received other raw data instances, and a differential model from the one or more differential features, wherein the differential features are generated without the individual-specific raw data instances; and
in response to an event trigger that indicates a request to remove influence of the individual from the trained native AI model, determine whether the influence of the individual on the trained native AI model was a high level of influence defined as at least 3 percent, based at least in part on;
compare the native features against the differential features to determine one or more feature influence levels of the individual-specific raw data instance on the native features;
compare the trained native AI model against the differential model to determine a model influence level of the individual-specific raw data instance on the trained native AI model;
compare at least one of the one or more feature influence levels, or the model influence level, to a specified threshold; and
in response to a determination that the influence of the individual on the trained native AI model was the high level of influence:
replace the native features and trained native AI model with the differential features and the differential model; and
delete the individual-specific raw data instances and the individual-specific resource data instances in accordance to the model influence level.

2. The IHS of claim 1, wherein the event trigger further comprises a user request, and wherein the instructions are further executed to determine the one or more feature influence levels, determine the model influence level, and compare at least one of the feature influence levels or the model influence level against the specified threshold in response to the user request to delete the individual-specific raw data instances.

3. The IHS of claim 2, wherein the instructions are further executed to:
when at least one of the feature influence levels or the model influence level exceeds the specified threshold, delete the native AI model and the individual-specific raw data instances, and schedule the native AI model to be re-trained; and
when at least one of the feature influence levels or the model influence level does not exceed the specified threshold, delete the individual-specific raw data instances without deletion of the native AI model.

4. The IHS of claim 2, wherein the instructions are further executed to:
determine whether the differential features associated with the individual are used in the native AI model; and
when the differential features are not used in the native AI model, delete the individual-specific raw data instances without deletion of the native AI model.

5. The IHS of claim 2, wherein the IHS comprises a multi-user IHS that administers the multi-user account, and the instructions are further executed to:

when at least one of the feature influence levels or the model influence level exceeds the specified threshold, delete the native AI model and schedule the native AI model to be re-trained; and when at least one of the feature influence levels or the model influence level does not exceed the specified threshold, leave the native AI model intact.

6. The IHS of claim 5, wherein the native AI process further comprises a plurality of AI services, and the instructions are further executed to:

for each of the AI services, compare the feature influence levels or the model influence level against the specified threshold when the AI service has used the individual-specific raw data instances of the individual.

7. The IHS of claim 1, wherein the differential AI process is provided as a cloud-based service.

8. A method comprising:

receiving, using instructions stored in at least one memory and executed by at least one processor, one or more individual-specific raw data instances associated with an individual, wherein the individual comprises a multi-user account;

receiving, using the instructions, a plurality of other raw data instances associated with individuals other than the individual;

receiving, using the instructions, a plurality of individual-specific resource data instances comprising measurements captured by sensors configured in an Information Handling System (IHS);

performing, using the instructions, a native artificial intelligence (AI) process to generate one or more native features according to the received other raw data instances, the individual-specific raw data instances associated with the multi-user account, and the individual-specific resource data instances, and generate a trained native AI model from the one or more native features, the trained native AI model configured to generate one or more profile recommendations determined to optimize IHS performance and energy usage, wherein the one or more profile recommendations are determined by the trained native AI model as a function of IHS performance and energy usage feature input derived from telemetry data including measurements captured by the sensors configured in the IHS, wherein the one or more profile recommendations comprise one or more of: adjusting one or more of a frame rate of a display resource, a refresh rate of a display resource, a computational frame rate of a GPU resource, an overclocking or underclocking level of a CPU resource, or a write optimized setting or a read optimized setting of a storage resource;

performing, using the instructions, a differential AI process to generate one or more differential features according to the received other raw data instances, and generate a differential model from the one or more differential features, wherein the differential features are generated without the individual-specific raw data instances; and in response to an event trigger indicating a request to remove influence of the individual from the trained native AI model, determining, using the instructions, whether the influence of the individual on the trained native AI model was a high level of influence defined as at least 3 percent, based at least in part on:

comparing, using the instructions, the native features against the differential features to determine one or more feature influence levels of the individual-specific raw data instance on the native features;

comparing, using the instructions, the trained native AI model against the differential model to determine a model influence level of the individual-specific raw data instance on the trained native AI model;

comparing at least one of the one or more feature influence levels, or the model influence level, to a specified threshold; and in response to determining that the influence of the individual on the trained native AI model was the high level of influence:

replacing, using the instructions, the native features and trained native AI model with the differential features and the differential model; and deleting, using the instructions, the individual-specific raw data instances and the individual-specific resource data instances according to the model influence level.

9. The method of claim 8, further comprising determining the one or more feature influence levels, determining the model influence level, and comparing at least one of the feature influence levels or the model influence level against the specified threshold in response to the event trigger, wherein the event trigger further comprises a user request to delete the individual-specific raw data instances.

10. The method of claim 9, further comprising:

when at least one of the feature influence levels or the model influence level exceeds the specified threshold, deleting the native AI model and the individual-specific raw data instances, and schedule the native AI model to be re-trained; and when at least one of the feature influence levels or the model influence level does not exceed the specified threshold, deleting the individual-specific raw data instances without deleting the native AI model.

11. The method of claim 9, further comprising:

determining whether the differential features associated with the individual are used in the native AI model; and when the differential features are not used in the native AI model, deleting the individual-specific raw data instances without deleting the native AI model.

12. The method of claim 9, further comprising:

when at least one of the feature influence levels or the model influence level exceeds the specified threshold, deleting the native AI model and schedule the native AI model to be re-trained; and when at least one of the feature influence levels or the model influence level does not exceed the specified threshold, leaving the native AI model intact, wherein the IHS comprises a multi-user IHS that administers the multi-user account.

13. The method of claim 12, wherein the native AI process further comprises a plurality of AI services, and the instructions are further executed to:

for each of a plurality of the AI services, comparing the feature influence levels or the model influence level against the specified threshold when the AI service has used the individual-specific raw data instances of the individual.

14. The method of claim 8, wherein the differential AI process is provided as a cloud-based service.

15. A non-transitory memory storage device configured with program instructions stored thereon that, upon execution by one or more processors of an Information Handling System (IHS), cause the IHS to:

receive one or more individual-specific raw data instances associated with an individual, wherein the individual comprises a multi-user account;

receive a plurality of other raw data instances associated with individuals other than the individual;

receive a plurality of individual-specific resource data instances comprising measurements captured by sensors configured in the IHS;

perform a native artificial intelligence (AI) process to generate one or more native features in accordance to the received other raw data instances, the individual-specific raw data instances associated with the multi-user account, and the individual-specific resource data instances, generate a trained a native AI model from the one or more native features, the trained native AI model configured to generate one or more profile recommendations determined to optimize IHS performance and energy usage, wherein the one or more profile recommendations are determined by the trained native AI model as a function of IHS performance and energy usage feature input derived from telemetry data that includes measurements captured by the sensors configured in the IHS, wherein the one or more profile recommendations comprise one or more of: adjust one or more of a frame rate of a display resource, a refresh rate of a display resource, a computational frame rate of a GPU resource, an overclocking or underclocking level of a CPU resource, or a write optimized setting or a read optimized setting of a storage resource;

perform a differential AI process to generate one or more differential features in accordance to the received other raw data instances, and generate a differential model from the one or more differential features, wherein the differential features are generated without the individual-specific raw data instances; and in response to an event trigger that indicates a request to remove influence of the individual from the trained native AI model, determine whether the influence of the individual on the trained native AI model was a high level of influence defined as at least 3 percent, based at least in part on:

compare the native features against the differential features to determine one or more feature influence levels of the individual-specific raw data instance on the native features;

compare the trained native AI model against the differential model to determine a model influence level of the individual-specific raw data instance on the trained native AI model;

compare at least one of the one or more feature influence levels, or the model influence level, to a specified threshold; and in response to a determination that the influence of the individual on the trained native AI model was the high level of influence:

replace the native features and trained native AI model with the differential features and the differential model; and delete the individual-specific raw data instances and the individual-specific resource data instances in accordance to the model influence level.

16. The memory storage device of claim 15, wherein the instructions are further executed to determine the one or more feature influence levels, determine the model influence level, and compare at least one of the feature influence levels or the model influence level against the specified threshold in response to the event trigger, wherein the event trigger further comprises a user request to delete the individual-specific raw data instances.

17. The memory storage device of claim 16, wherein the instructions are further executed to:

when at least one of the feature influence levels or the model influence level exceeds the specified threshold, delete the native AI model and the individual-specific raw data instances, and schedule the native AI model to be re-trained; and when at least one of the feature influence levels or the model influence level does not exceed the specified threshold, delete the individual-specific raw data instances without deletion of the native AI model.

18. The memory storage device of claim 16, wherein the instructions are further executed to:

determine whether the differential features associated with the individual are used in the native AI model; and when the differential features are not used in the native AI model, delete the individual-specific raw data instances without deletion of the native AI model.

19. The memory storage device of claim 16, wherein the IHS comprises a multi-user IHS that administers the multi-user account, and the instructions are further executed to:

when at least one of the feature influence levels or the model influence level exceeds the specified threshold, delete the native AI model and schedule the native AI model to be re-trained; and when at least one of the feature influence levels or the model influence level does not exceed the specified threshold, leave the native AI model intact.

20. The memory storage device of claim 19, wherein the native AI process further comprises a plurality of AI services, and the instructions are further executed to:

for each of the AI services, compare the feature influence levels or the model influence level against the specified threshold when the AI service has used the individual-specific raw data instances of the individual.

* * * * *